US005768082A

United States Patent [19]

Lange et al.

[11] Patent Number: 5,768,082

[45] Date of Patent: Jun. 16, 1998

[54] GAS-FILLED SURGE VOLTAGE PROTECTOR

[75] Inventors: Gerhard Lange; Juergen Boy, both of Berlin, Germany

[73] Assignee: Siemens Aktiengesellschaft, Munich, Germany

[21] Appl. No.: 722,545

[22] Filed: Sep. 27, 1996

[30] Foreign Application Priority Data

Sep. 29, 1995 [DE] Germany ........................ 195 37 520.3

[51] Int. Cl.[6] ........................ H02H 9/06

[52] U.S. Cl. ........................ 361/120; 361/112

[58] Field of Search ........................ 361/112, 117, 361/118, 119, 120, 129; 174/40 CC; 248/49, 50, 62

[56] References Cited

U.S. PATENT DOCUMENTS

| | | | |
|---|---|---|---|
| 3,885,203 | 5/1975 | Baker et al. | 361/117 |
| 4,212,047 | 7/1980 | Napiorkowski | 361/124 |
| 4,266,260 | 5/1981 | Lange et al. | 361/120 |
| 4,287,548 | 9/1981 | Hahndorff | 361/120 |
| 4,984,125 | 1/1991 | Uwano | 361/124 |
| 5,569,972 | 10/1996 | Lange | 361/120 |

FOREIGN PATENT DOCUMENTS

| | | | |
|---|---|---|---|
| 44 44 515 | 4/1986 | Germany | H01T 1/22 |
| 43 30 178 | 3/1995 | Germany | H01T 4/02 |

*Primary Examiner*—Ronald W. Leja

*Attorney, Agent, or Firm*—Kenyon & Kenyon

[57] ABSTRACT

A gas-filled surge voltage protector with a high current-carrying capacity. The protector has electrode contacts implemented as strip clamps which in the areas of the end electrodes also surround contact rings that are placed on the base part of the end electrodes. The strip clamps are made of tin-plated sheet metal. One end of the metal strip is designed as a contact element.

9 Claims, 2 Drawing Sheets

GAS-FILLED SURGE VOLTAGE PROTECTOR

FIELD OF THE INVENTION

The present invention relates to the field of surge voltage protectors for communications networks, and more specifically to elements carrying current to the electrodes of a gas-filled surge voltage protector.

BACKGROUND INFORMATION

To protect against voltage surges due to lightning, for example, gas-filled surge voltage protectors are used in communications networks and associated equipment. Such surge voltage protectors may have one, two or three discharge paths and they consist of two end electrodes plus optionally one additional electrode in the form of a center electrode plus one or two hollow cylindrical ceramic insulators. As a rule, the ceramic insulator in a two-electrode surge voltage protector is soldered to the end electrodes at the sides (as described in U.S. Pat. No. 4,266,260), and in a three-electrode surge voltage protector the ceramic insulators are soldered to the central electrode and one of the end electrodes either on the circumference or at the end (as described in U.S. Pat. Nos. 3,885,203 and 4,212,047). When the electrodes are contacted on their outer circumference, this is accomplished either with the help of resilient insulation-piercing connecting devices inside a casing or with the help of connecting wires that are soldered or welded at one end tangentially or radially to one electrode and have a plug-in contact element at the other end or are designed for soldering (as described in U.S. Pat. Nos. 4,212,047 and 4,984,125).

With a three-electrode surge voltage protector where the electrodes are made of copper, designs have been proposed for soldering a special contact ring onto the flange-like base part of each end electrode and then welding a connecting wire to the outside circumference of the contact ring (see, e.g., German Patent No. 43 30 178; U.S. patent application Ser. No. 290,274 filed Aug. 15, 1994).

Furthermore, a design has been proposed for gas-filled surge voltage protectors of the highest power class that can carry a discharge current of approximately 20 amps over each of the two discharge paths, at the same time, for 11 periods at 60 Hz. This design is characterized by end electrodes made of copper with a solid cylindrical part in the area of each discharge path plus a center electrode in the form of a hollow cylinder, where the center electrode is soldered at the side to the insulators that are also hollow cylinders and to the flange-like base part of one end electrode. The end electrodes are again contacted with the help of a contact ring soldered axially onto the respective base part to which a connecting wire is welded as the current carrying element (as described in German Patent Application No. P 44 44 515.6) Such a method of contacting the end electrodes can also be used for surge voltage protectors with two electrodes.

SUMMARY OF THE INVENTION

The present invention provides a gas-filled surge voltage protector with at least two copper electrodes designed as end electrodes with a flange-like base part and with at least one hollow cylindrical ceramic insulator soldered at the side to the base part of an end electrode and to another electrode. A contact ring is soldered to the base part of each end electrode and the two contact rings are each provided with a current carrying element facing radially outward on their outside circumference. In the surge voltage protector of the present invention, each current carrying element consists of a strip clamp made of tin-plated sheet metal, the clamps in the area of the end electrodes surround the contact ring as well as the base part of the end electrode, and one end of the metal strip of each clamp forms a contact element.

An object of the present invention is to design the current-carrying elements of the surge arrester such that they can safely withstand even such extreme loads as those associated with a lightning strike with a surge of up to 20 kA.

This object is achieved according to the present invention by the fact that each current carrying element consists of a strip-like clamp made of a tin-plated sheet metal, where the clamps in the area of the end electrodes surround the contact ring as well as the base part of one end electrode, and the end of the metal strip of each clamp forms a contact element.

Such a design of the current-carrying elements assures a large-area current transfer from the current carrying element to each electrode of the surge arrester, where not only the welded-on contact ring on the end electrodes but also the base part of the end electrodes is involved in the current transfer. This is assured by the tin layer on the sheet metal, which is flexible enough to compensate for any unevenness in the area of the base part and the contact ring of each end electrode.

With regard to the electric connection of the current-carrying elements to the respective device or the surrounding communications network, the contact elements of the electrodes may be designed as soldered contacts or as plug-in contacts. In an embodiment suitable for three-electrode surge voltage protectors for special applications, the two contact elements of the end electrodes are designed as soldered contacts and the contact element of the center electrode is a plug-in contact. The contact element of the center electrode may also be part of a separate metal strip that is secured at one end in the strip clamp fastener, which may be designed as a detachable nut-and-bolt connection or as a permanent connection in the form of a rivet or an ultrasonic weld.

The current-carrying element provided according to the present invention is intended for use specifically in surge voltage protectors of the highest power class, where the hollow cylindrical ceramic insulator or the two hollow cylindrical ceramic insulators are provided with central conducting strips on the inside surface and/or with conducting strips attached to the two adjacent electrodes. In this case, it is advantageous to design the two strip clamps of the two end electrodes so they are wide enough to surround the adjacent ceramic insulator on part of its axial length. This length of the ceramic insulator surrounded by strip clamps preferably amounts to two-thirds to three-quarters of the axial length of the ceramic insulator in a three-electrode surge arrester with a hollow cylindrical center electrode. The electric field created with the help of the conducting strips between the electrodes of the surge voltage protector is distorted by this measure and thus the impulse sparkover voltage is reduced.

In particular, tin-plated copper or brass plate is a suitable material for the strip clamps. However, other types of sheet metal having a comparable ductility may also be used.

DETAILED DESCRIPTION

Figure 1:
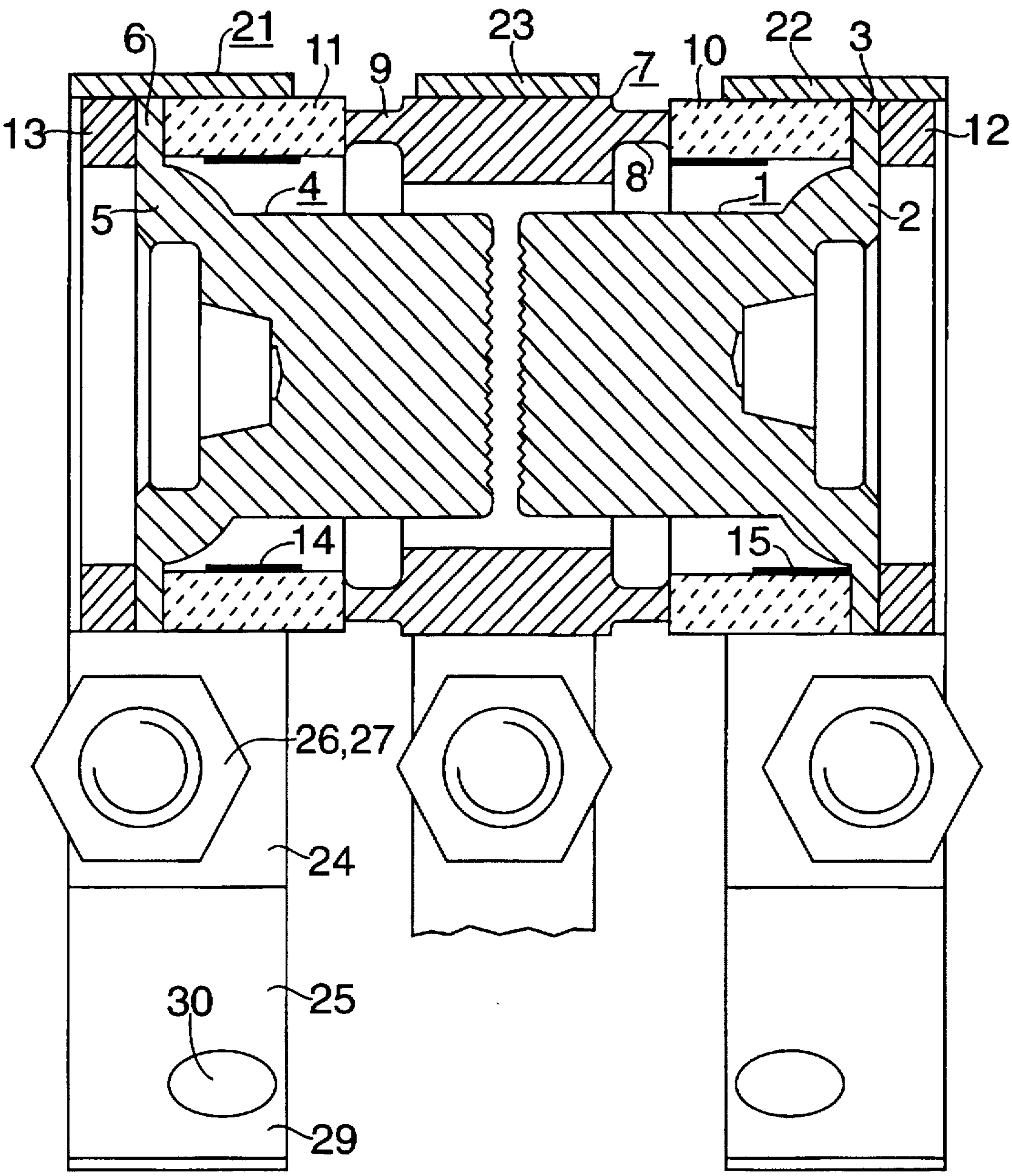
FIG. 1 shows a longitudinal section through a gas-filled three-electrode surge voltage protector of the highest power class, according to German Patent Application No. P 44 44 515.6, with a current connection for each electrode in the form of a strip clamp.

The surge voltage protector illustrated in FIG. 1 comprises two cylindrical end electrodes 1 and 4, with a center electrode 7 concentric therewith, and two hollow cylindrical ceramic bodies 10 and 11. End electrodes 1 and 4 are made of copper and are essentially cylindrical, having base parts 2 and 5 ending in soldering flanges 3 and 6, respectively. Hollow cylindrical center electrode 7 has a radial step 8 on the inside circumference at each end and has another radial step 9 on the outside circumference. Center electrode 7 and insulators 10 and 11 are soldered together at the sides. Likewise, insulators 10 and 11 are also soldered to base parts 2 and 5 of end electrodes 1 and 4 at the sides. Contact rings 12 and 13 made of a material having a special thermal expansion coefficient are also soldered to soldering flanges 3 and 6 of the two end electrodes.

To supply power to the two end electrodes 1 and 4 and center electrode 7, two strip clamps 21 and 22 are arranged on the circumference of end electrodes 1 and 4, and strip clamp 23 is arranged on the circumference of center electrode 7. The width of the clamping strip of clamps 21 and 22 is selected so that the strip is in contact with contact rings 12 and 13 as well as with flanges 3 and 6, respectively, and also surrounds ceramic insulators 10 and 11, respectively, for part of their axial lengths. This influences the electric field inside the surge protector which is created by the central conducting strips 14 applied to the inside surface of ceramic insulators 10 and 11 and/or conducting strips 15 alternately attached to center electrode 7 and one end electrode 1 or 4. In the present case, strip clamps 21 and 22 surround the adjacent ceramic insulators 10 and 11, respectively, for about 70% of their axial lengths.

Each of the strip clamps 21, 22 and 23 is made essentially of a tin-plated copper strip that is secured to the circumference of the surge arrester by a fastener, which in this case consists of a nut 27 and a bolt 26 between which the two strip ends 24 and 25 are secured. Strip end 25 also forms a contact tongue 29 that has a soldering hole 30.

Figure 2:
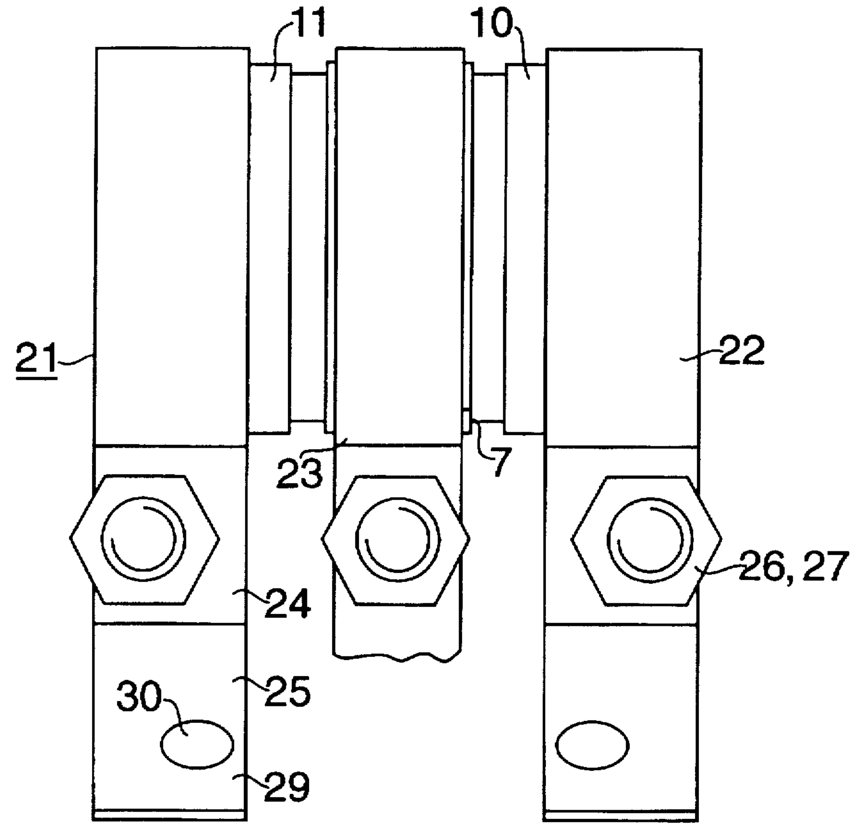
FIG. 2 shows a view of the same surge protector across the longitudinal axis.

FIG. 2 shows how the strip clamps 21, 22 and 23 completely surround the two end electrodes and the center electrode, respectively, in the circumferential direction.

Figure 3:
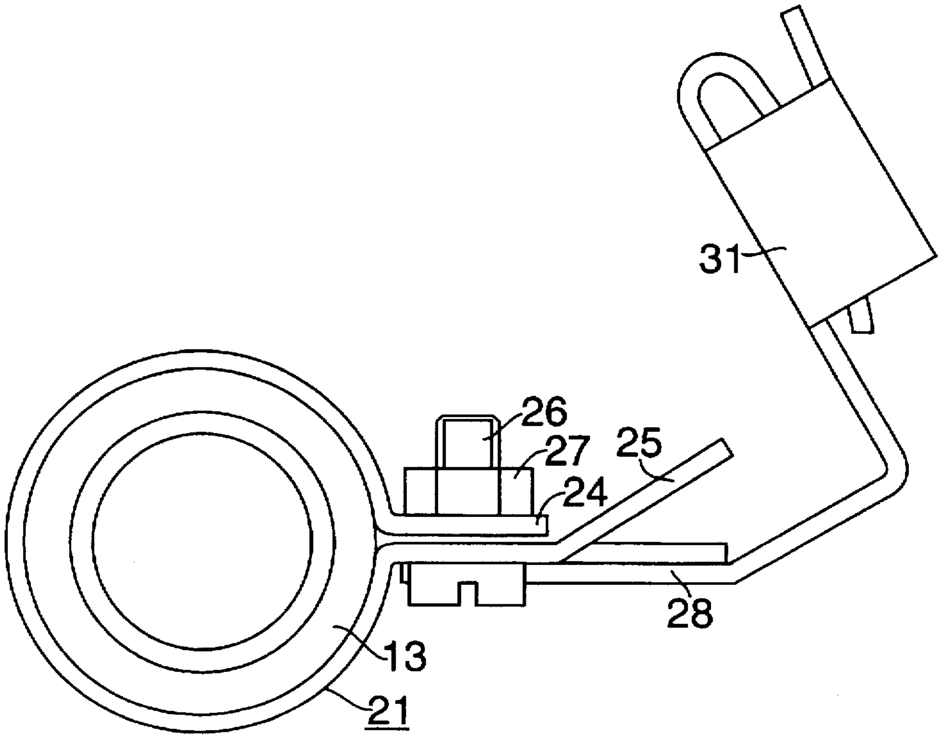
FIG. 3 shows a view of the same surge protector along the longitudinal axis.

FIG. 3 shows that an additional strip piece 28 is also included in strip clamp fastener 23 of the center electrode and has one end in contact with strip end 25 of the strip clamp of the center electrode and the other end is designed as a plug-in contact 31.

What is claimed is:

1. A gas-filled surge voltage protector comprising:

two end electrodes made of copper, each end electrode including a flange-like base part;

at least one hollow cylindrical ceramic insulator soldered to the base part of at least one of the end electrodes; and two contact rings, each soldered to the base part of a respective one of each end electrode and each including a current carrying element facing radially outward on its outside circumference, wherein:

each current carrying element includes a strip clamp with a tin-plated sheet metal strip, each of the strip clamps surrounds a respective one of the contact rings and a respective one of the base parts of the end electrode, and one end of the metal strip of each strip clamp includes a contact element.

2. The surge voltage protector of claim 1, wherein the contact element is a soldering contact.

3. The surge voltage protector of claim 1, wherein there are two ceramic insulators, each of the strip clamps partially surrounds a respective one of the ceramic insulators.

4. The surge voltage protector of claim 1, further comprising a center electrode including a current-carrying element formed as a strip clamp made of tin-plated sheet metal, wherein an end of the metal strip forms a contact element.

5. The surge voltage protector of claim 4, wherein an inner surface of the ceramic insulator is provided with at least one of a central conducting strip and a conducting strip attached alternately to one of the end electrodes and to the center electrode.

6. The surge voltage protector of claim 4, wherein the contact element of the current-carrying element of the center electrode is a clamp-type contact.

7. The surge voltage protector of claim 1, wherein the protector includes two ceramic insulators and each of the strip clamps surrounds a respective one of the ceramic insulators over a part of an axial length of the respective ceramic insulator.

8. The surge voltage protector of claim 4, wherein an inner surface of the ceramic insulator is provided with a central conducting strip attached to the center electrode.

9. The surge voltage protector of claim 4, wherein an inner surface of the ceramic insulator is provided with a conducting strip attached to one of the end electrodes.

* * * * *